E. D. BURDIN.
KITCHEN UTENSIL FOR DRAINING COOKING VESSELS.
APPLICATION FILED MAR. 16, 1912.

1,058,146.

Patented Apr. 8, 1913.

WITNESSES:
B. F. Burgess.
Anna Haskins

INVENTOR
Eva D. Burdin
BY
C. D. Haskins
ATTORNEY

UNITED STATES PATENT OFFICE.

EVA D. BURDIN, OF WHITE BLUFF, WASHINGTON.

KITCHEN UTENSIL FOR DRAINING COOKING VESSELS.

1,058,146. Specification of Letters Patent. Patented Apr. 8, 1913.

Application filed March 16, 1912. Serial No. 684,305.

*To all whom it may concern:*

Be it known that I, EVA D. BURDIN, citizen of the United States, residing at White Bluff, in the county of Benton and State of Washington, have invented a certain new and useful Improvement in Kitchen Utensils for Draining Cooking Vessels, of which the following is a specification.

My invention relates to improvements in kitchen utensils and particularly to devices adapted for use in the operation of draining water or other liquid out of a cooking vessel which may also contain solids like potatoes or other vegetables; and the object of my invention is to provide a simple and effective utensil whereby pots and kettles whose contents may be boiling hot can easily be manipulated and emptied of their contents without subjecting one's hands to the heat of the vessel itself or to the heat of the steam arising from its contents. I attain this object in the manner illustrated in the accompanying drawing in which—

Figure 1:
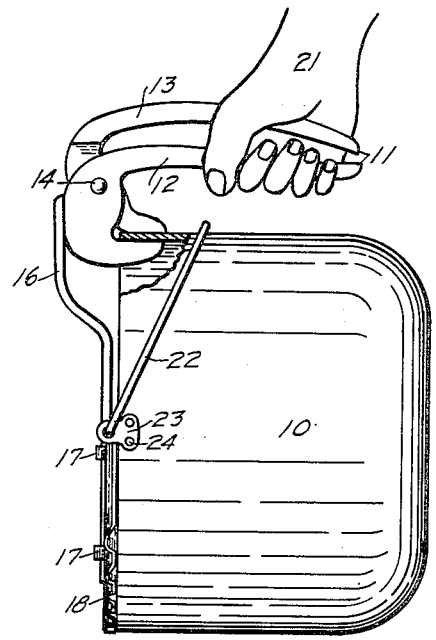
Figure 2:
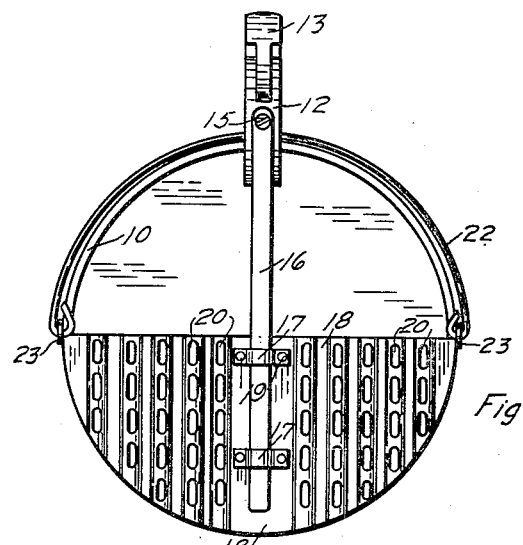
Figure 3:
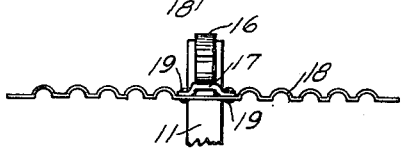

Figure 1, is a view in side elevation of my invention applied to a stew kettle; Fig. 2, is a plan view of the same and Fig. 3, is a fragmentary view in end elevation of a part of my device without the kettle.

Referring to the drawings in which like parts are indicated by like numbers, a stew kettle 10, having a bail 22 looped through the ears 23 which are secured by means of rivets 24, may be gripped or seized by the holder 11 in the manner illustrated, which holder 11 may be constructed preferably of iron although other materials may be employed. Holder 11, somewhat like a pair of pliers, is made in two parts 12 and 13 which parts 12 and 13 are hingedly fastened together by means of a rivet 14, in a manner well known, which rivet 14 acts as a fulcrum so that a great deal more pressure may be exerted to grip the edge of the kettle 10 by the jaws of parts 12 and 13 than is exerted by one's hand 21 on the handle of the holder 11. Fastened to the top of part 12 by means of screw 15 is strip 16, which is formed to be slidably inserted into the straps 17 which are fixed to the corrugated plate 18 by means of the rivets 19. The corrugated plate 18 is perforated with holes 20 through which liquid may pass during the process of draining a vessel but the holes of small size may prevent the egress of the vegetables or other solids.

The operation of my invention is as follows: After the lid of the kettle to be drained is removed, the sliding corrugated plate 18 may be adjusted on strip 16 to reach the edge of the kettle 10 opposite the holder 11, then the edge of kettle 10 is firmly gripped by the jaws of holder 11 so that plate 18 bears hard against the top edge of said kettle 10, whereupon the kettle 10 may be picked up by holder 11 and carried to a sink or other place where the excess liquid is to be disposed and by the tipping up of said kettle the liquid can be drained through small holes 20 in plate 18, the solids being retained in the kettle, and during such operation one's hands may be subjected to no painful contact with steam or radiant heat.

If desired the handles of the holder 11 may be covered or served with a material that is a poor heat conductor, and the form of the parts of the holder 11 and the plate 16 may be modified as desired, and also various suitable means will suggest themselves for maintaining in a desired position the plate 18 on the strip 16 without departing from the scope of my invention.

What I claim is:

In a device of the class described, the combination with pliers having jaws whose faces normally are parallel with its handles, of an arm securely attached to one member of said pliers to extend therefrom in a plane substantially at a right angle to said faces of said jaws and a strainer slidably mounted on said arm.

In witness whereof, I hereunto subscribe my name this twenty first day of February A. D., 1912.

EVA D. BURDIN.

Witnesses:
B. P. BURGESS,
ANNA HASKINS.